United States Patent
Budka et al.

(10) Patent No.: US 6,577,871 B1
(45) Date of Patent: Jun. 10, 2003

(54) TECHNIQUE FOR EFFECTIVELY MANAGING PROCESSING LOADS IN A COMMUNICATIONS ARRANGEMENT

(75) Inventors: Kenneth Carl Budka, Marlboro, NJ (US); Bruno Ludwig, Heroldsberg (DE); Klaus Wirth, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/315,723

(22) Filed: May 20, 1999

(51) Int. Cl.[7] ................................. H04Q 7/20
(52) U.S. Cl. ...................... 455/453; 455/449; 455/452
(58) Field of Search .............................. 455/453, 423, 455/452, 449, 422, 432, 436, 450, 464, 509; 370/329, 331, 341, 431; 379/112.01, 112.03, 112.04, 112.1

(56) References Cited

U.S. PATENT DOCUMENTS

| | | | | |
|---|---|---|---|---|
| 4,670,899 A | * | 6/1987 | Brody et al. | 455/453 |
| 4,974,256 A | | 11/1990 | Cyr et al. | |
| 5,379,448 A | * | 1/1995 | Ames et al. | 455/453 |
| 5,539,729 A | * | 7/1996 | Bodnar | 370/232 |
| 5,539,883 A | * | 7/1996 | Allon et al. | 370/237 |
| 5,697,054 A | * | 12/1997 | Andersson | 455/524 |
| 5,790,955 A | * | 8/1998 | Tomoike | 455/405 |
| 5,873,038 A | * | 2/1999 | Guimont | 455/453 |
| 5,912,884 A | * | 6/1999 | Park et al. | 370/331 |
| 6,014,567 A | * | 1/2000 | Budka | 455/453 |
| 6,055,433 A | * | 4/2000 | Yuan et al. | 455/422 |
| 6,138,025 A | * | 10/2000 | Lee et al. | 455/435 |
| 6,240,287 B1 | * | 5/2001 | Cheng et al. | 455/422 |
| 6,263,212 B1 | * | 7/2001 | Ross et al. | 370/428 |
| 6,266,531 B1 | * | 7/2001 | Zadeh et al. | 455/422 |
| 6,363,052 B1 | * | 3/2002 | Hosein | 370/230 |
| 6,385,449 B2 | * | 5/2002 | Eriksson et al. | 455/436 |

FOREIGN PATENT DOCUMENTS

WO   WO 96/06512 A1 * 2/1996 ............ H04Q/7/38

* cited by examiner

*Primary Examiner*—Charles N. Appiah
(74) *Attorney, Agent, or Firm*—Moser, Patterson & Sheridan, LLP

(57) ABSTRACT

In a wireless communications service where the service area is divided into multiple cells, a common workstation (COWS) is connected to multiple cell workstations (CEWSs) in hierarchial relation to realize the service. The COWS performs call processing and other tasks common to all cells served by the CEWSs. The latter perform call setups, paging message distributions, and other cell specific operations. First and second central processing unit (CPU) overload control routines are run on the COWS and each CEWS, respectively, to manage their CPU loads. Specifically, different defense actions may be applied by the first and second routines to alleviate the CPU loads of the COWS and CEWS, respectively. These defense actions include COWS's dropping a fraction of paging messages to be processed thereby, and CEWS's dropping a fraction of paging messages, short message service (SMS) broadcast messages and radio frequency (RF) signal strength messages to be processed thereby. In addition, depending on the CPU loads of the COWS and the respective CEWSs, selected classes of mobile units are temporarily denied the wireless communications service.

51 Claims, 4 Drawing Sheets

100

FIRST MEASUREMENT PERIOD

SECOND MEASUREMENT PERIOD

THIRD MEASUREMENT PERIOD

US 6,577,871 B1

TECHNIQUE FOR EFFECTIVELY MANAGING PROCESSING LOADS IN A COMMUNICATIONS ARRANGEMENT

FIELD OF THE INVENTION

The invention relates to systems and methods for controlling central processing unit (CPU) loads, and more particularly to systems and methods for managing such CPU loads in processing communication calls.

BACKGROUND OF THE INVENTION

Nowadays, virtually everyone is "connected" via various communications services such as telephone, pager and e-mail services. The telephone service includes the plain old telephone service (POTS), which is the most common of all of the communication services, and proliferating wireless phone services including an advanced mobile phone service (AMPS), a personal communications service (PCS), a global system for mobile communications (GSM) service, etc.

The efficiency of the communications services invariably depends on the speed of call processing which involves establishing and maintaining communications connections. To increase such an efficiency, multiple processors have been employed in a communications system to perform data processing operations necessary to set up and control each call in the system. For example, in a prior art wireless phone system, these processors are connected in a distributed processing arrangement where each processor is capable of performing identical call processing functions so that any new call can be served by any of the processors. However, to maximize system capacity and minimize call setup delays, it is important that each new call is allocated to an appropriate processor to balance the aggregate processing load. In addition, it is important that the processors respond to an overload condition in such a way that the communications traffic handled thereby is equal or at least close to the maximum amount of traffic that the system can handle when not in an overload condition, and at the same time the disposition of additional calls does not interfere with the processing of existing calls or those new calls already accepted by the system.

The above-identified concerns about call processing load control have been addressed, e.g., in U.S. Pat. No. 4,974,256 issued Nov. 27, 1990 to Cyr et al. Specifically, the Cyr patent discloses a technique for load balancing and overload control in a distributed processing communication system. In accordance with the disclosed technique, also known as the "go/no-go sequence" technique, the average CPU load of each processor is measured periodically and based on this CPU load, the fraction of new calls to be allocated to each processor during the next period is adjusted in such a manner as to attempt to equalize the CPU loads of all the processors during that period.

SUMMARY OF THE INVENTION

It may be advantageous to apply the prior art technique described above in a distributed processing arrangement where each processor performs identical functions to manage the CPU load of the processor. However, such a prior art technique is not particularly applicable to a processing arrangement where a central processor is connected to multiple child processors in hierarchial relation. In this relation, the central processor is in communication with each child processor, and centrally performs certain tasks which otherwise need to be performed by each child processor. For example, in the GSM service where the service area is divided into multiple cells, these cells are served by child processors, e.g., cell workstations (CEWSs), in a base station controller. A central processor, e.g., a common workstation (COWS), is connected to the CEWSs in a hierarchial processing arrangement where the COWS performs call processing and other tasks common to all cells served by the CEWSs. The CEWSs perform other well known call processing functions such as call setups, paging message distributions, etc., to realize the GSM service.

Because of the different roles played by the central processor and each child processor in a hierarchial processing arrangement, as opposed to the same role played by each processor in a distributed processing arrangement, in accordance with the invention, two different routines are designed to identify CPU overload conditions of the central processor and each child processor, respectively. In addition, actions taken by the central processor while in CPU overload to reduce its CPU load are different from those taken by a child processor while in CPU overload. Further, the central processor may cause each child processor to take a selected action as a function of both the severity of the CPU load of the central processor and that of the child processor to adjust the respective CPU loads. In the above GSM service example, the selected action may involve having each CEWS deactivate the mobile units which are assigned to certain access classes in the cells served by the CEWS.

DETAILED DESCRIPTION

Figure 1:
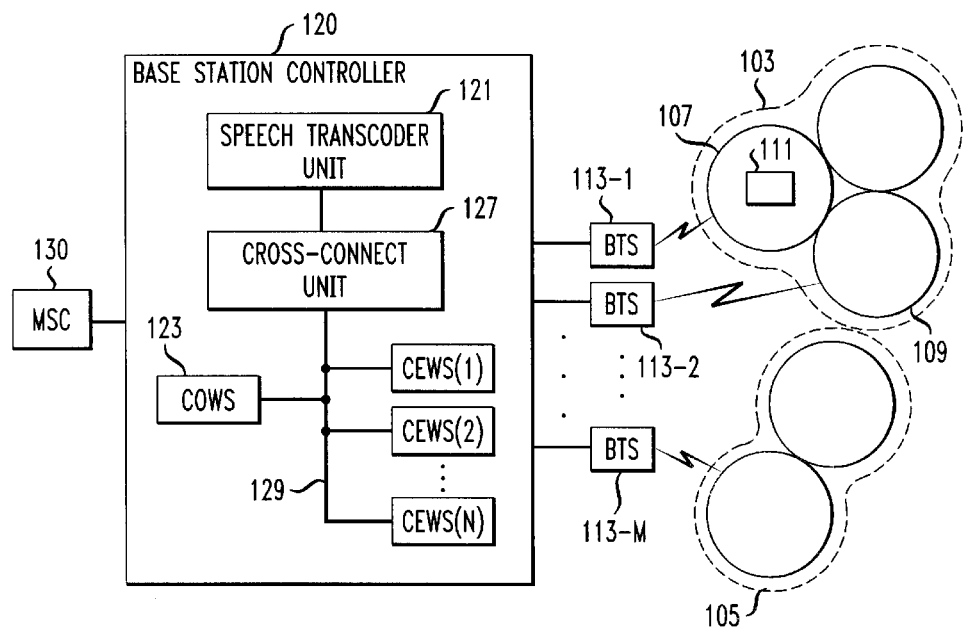
FIG. 1 is a block diagram of a communications arrangement for realizing a communication service in accordance with the invention.

FIG. 1 illustrates communications arrangement 100 embodying the principles of the invention for realizing a wireless phone service, e.g., a global system for mobile communications (GSM) service.

Typically, the GSM service area is divided into location areas, e.g., location areas 103 and 105 (defined in dashed lines), each including multiple cells. In this instance, location area 103 includes, among others, cell 107 and cell 109. Mobile units, e.g., radiotelephones, in each cell transmit and receive calls in a wireless manner via one of base transceiver station (BTS) 113-1 through 113-M which is associated with the cell, in accordance with the GSM service, where M is an integer greater than or equal to one. Illustratively, the mobile units, e.g., unit 111, in cell 107 transmit and receive calls in a wireless manner through BTS 113-1. The calls to and from BTS 113-1 through 113-M are processed in base station controller 120 described below, and switched by mobile switching center (MSC) 130 in a well known manner via, say, a public switched telephone network (PSTN) to realize communication connections between the mobile units served by the MSC 130 and the corresponding communication terminals, which may or may not be a mobile unit.

Controller 120 includes speech transcoder unit 121, cross-connect unit 127, common workstation (COWS) 123, and N cell workstations denoted CEWS(1) through CEWS(N), respectively, where N is an integer smaller than M. Unit 121 of conventional design reformats the communication information coming from MSC 130 which is in a trunk format to a packet format in accordance with the GSM specification for wireless communications. Conversely, it reformats the communication information coming from the mobile units which is in the packet format to the trunk format for circuit-switched communications. Unit 127 of conventional design maps trunks carrying packetized communication information from speech transcoder unit 121 to trunks to BTS 113-1 through 113-M, and vice versa. Unit 127 also routes call control packets between the BTSs and the CEWSs and COWS 123, and between COWS 123 and MSC 130. COWS 123, CEWS(1) through CEWS(N) and unit 127 exchange call control messages via local area network 129, e.g., an Ethernet. COWS 123 is connected to CEWS(1) through CEWS(N) in a hierarchial arrangement where COWS 123 is in communication with each CEWS. For example, COWS 123 performs call processing and other tasks common to all cells served by CEWS(1) through CEWS(N), including termination of communication connections with MSC 130, and control of cross-connects with unit 127. CEWS(1) through CEWS(N) each serve multiple cells and perform other well known call processing functions such as call setups, paging message distributions, airlink signal strength measurements, handover executions, and other cell specific operations and maintenance.

Each mobile unit, e.g., unit 111, sends a location update message each time it enters a new location area, or upon expiry of a periodic update timer, or when the unit powers on or off. Thus, the number of location update messages to be handled by controller 120 varies with the number of cells in each location area, and the number and movement of mobile subscribers therein. The current location area of each mobile unit is registered in MSC 130. When an incoming call is directed to a mobile unit, MSC 130 generates a paging message for paging the mobile unit for the incoming call. The paging message is broadcast by COWS 123 to CEWS (1) through CEWS(N). In the worst case, depending on the paging message format, those CEWSs serving the cells of the location area of the paged mobile unit each have to duplicate and distribute the paging message to the corresponding cells. Thus, if the location areas are relatively large and each include a relatively large number of cells, the number of location update messages handled by controller 120 would be relatively small. However, the number of paging messages to be duplicated by CEWS(1) through CEWS(N) would be relatively large. Conversely, having relatively small location areas would result in a relatively large number of location update messages to be handled and a relatively small number of duplications of paging messages. In any event, processing each paging message consumes much CPU time of COWS 123 and the responsible CEWSs in particular.

In addition to paging messages, CEWS(1) through CEWS (N) need to process other call processing messages to realize the GSM service, which include short message service (SMS) cell broadcast messages, channel required messages, radio frequency (RF) signal strength (MEAS_RES) messages, etc. Specifically, CEWS(1) through CEWS(N) periodically, e.g., once every 2.5 seconds, cause SMS cell broadcast messages to be broadcast to mobile units in the respective cells. Such broadcast messages are pre-programmed and may be used to identify the GSM service provider, to disseminate emergency information, etc.

Each CEWS maintains cell tables for the corresponding cells to keep track of idle and busy channels in the cells. For example, when a mobile unit in a cell requires a new communication connection, it transmits a channel required message to the CEWS serving the cell. In response, the CEWS checks the corresponding cell table and allocates any idle channel to establish the communication connection.

In addition, each CEWS processes a steady stream of MEAS_RES messages from all active mobile units in the corresponding cells. An active mobile unit is one currently involved in an active call. Each active mobile unit sends about two MEAS_RES messages per second. The messages provide a measurement of the strength of the RF signal for wireless communications between the mobile unit in a cell and the BTS serving the cell. For example, as a mobile unit is moving from a first cell to a second cell, the MEAS_RES messages from the mobile unit indicate that the strength of the RF signal gradually weakens to a point where the CEWS corresponding to the first cell may need to perform a handover of the call to the CEWS corresponding to the second cell before the call is dropped. In order not to drop an active call because of a lack of the RF signal strength, the CEWS needs to process at least every other MEAS_RES message, i.e., about one MEAS_RES per second, from each active mobile unit in the corresponding cells.

We have recognized that a heavy CPU load sustained by COWS 123 and/or CEWS(1) through CEWS(N) because of a high volume of calls handled by controller 120 may cause delays in their response to the above call processing messages. Excessive response times would result in dropped calls, failed handovers and other undesirable effects.

Figure 2:
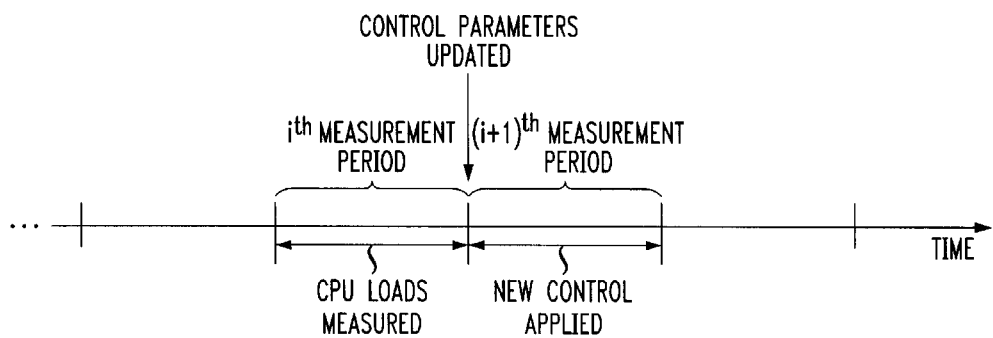
FIG. 2 illustrates a series of measurement periods at the end of which control parameters are updated to manage CPU loads of various workstations in the arrangement of FIG. 1.

Thus, in accordance with the invention, CPU overload control routines (described below), which involve a number of control parameters, are designed and run on COWS 123 and each CEWS, respectively, to manage their CPU load. To that end, a series of measurement periods are defined over time as shown in FIG. 2. Each of COWS 123 and CEWS(1) through CEWS(N) in a well known manner measures the fraction of CPU time that it spends processing call handling-related tasks in an $i^{th}$ measurement period, $1 \leq i$. Based on such CPU load measurements, the control parameters in the aforementioned routines are updated at the end of the measurement period. As a result, new control is applied by the routines in the $(i+1)^{th}$ measurement period to manage the CPU loads.

If the CPU load measurement of any of CEWS(1) through CEWS(N) (or COWS 130) is extremely high, the CEWS (or COWS 130) immediately declares a CPU overload. However, if the CPU load measurement exceeds a first predetermined threshold, but does not exceed a second higher predetermined threshold to warrant immediate defense actions, the CEWS (or COWS 130) needs to wait a "cool-off period," e.g., a predetermined number of measurement periods, during which such a CPU load condition persists before declaring a CPU overload. Advantageously, with the cool-off period in place, the CEWS (or COWS 130) would not be over-reactive and frequently flip-flop between declaring a CPU overload and undeclaring same, especially when the CPU load fluctuates around the first predetermined threshold.

Different defense actions may be initiated by the aforementioned control routines in accordance with the invention to alleviate the CPU load. One such action involves dropping a fraction of the above-described paging messages and SMS cell broadcast messages to be processed. For example, the fraction of such paging and SMS Cell broadcast messages dropped may be proportional to the severity of the CPU load.

In addition, each mobile unit is permanently assigned by hardware an access class, which varies from 0 to 15. Access classes 0–9 are allocated for general public use. On the other hand, access classes 10–15, known as "priority access classes," are reserved for use by emergency services, public utilities, security services, and GSM service provider staff. In particular, access class 11 can be assigned at the discretion of the GSM service provider to perhaps offer a premium service.

In accordance with an aspect of the invention, a ;defense action in response to a CPU overload may be sending control messages over a GSM's broadcast control channel (BCCH) to bar one or more access classes. Mobile units which belong to a barred access class must refrain from initiating calls, sending location update messages or responding to paging messages. For example, the number of barred access classes is proportional to the severity of the CPU load. The methodology for identifying the actual barred access classes, which is fully described below, is "fair" in the sense that the inconvenience of being barred is borne equally by all mobile units belonging to the general access classes. Priority access classes are barred only as a last resort. The access class barring defense action is particularly effective if an approximately equal number of mobile units are assigned to each general access class. As mentioned before, each of CEWS(1) through CEWS(N) processes a steady stream of MEAS_RES messages from active mobile units in the corresponding cells. Each active mobile unit sends approximately two MEAS_RES messages per second. A defense action for preventing a CEWS from a CPU overload may be dropping a fraction of MEAS_RES messages from the active mobile units corresponding to the CEWS. This defense action is particularly effective if the MEAS_RES messages are dropped by a radio terminal (not shown) in a BTS before the radio terminal forwards the messages to the corresponding CEWS. Otherwise, the CEWS needs to spend a significant CPU time or overhead on processing each MEAS_RES message just to identify the message before the CEWS can drop the message.

Moreover, during a CPU overload, non-critical operation and maintenance activities, e.g., software download, performance reporting, etc., may be deferred to mitigate the overload.

Further, as a fail-safe mechanism, all paging messages and channel required messages may be explicitly dropped for a period of time. This mechanism may be deployed only when, for example, dropping a fraction of paging messages does not provide adequate defense against, say, a sudden heavy surge in paging load and when the assignment of general access classes 0 through 9 is not substantially evenly distributed. As a result, access class barring does not adequately protect COWS 123 and CEWS(1) through CEWS(N) from overload. It should be noted that when such a fail-safe mechanism is deployed, the channel required messages are dropped irrespective of their associated access class.

Figure 3:
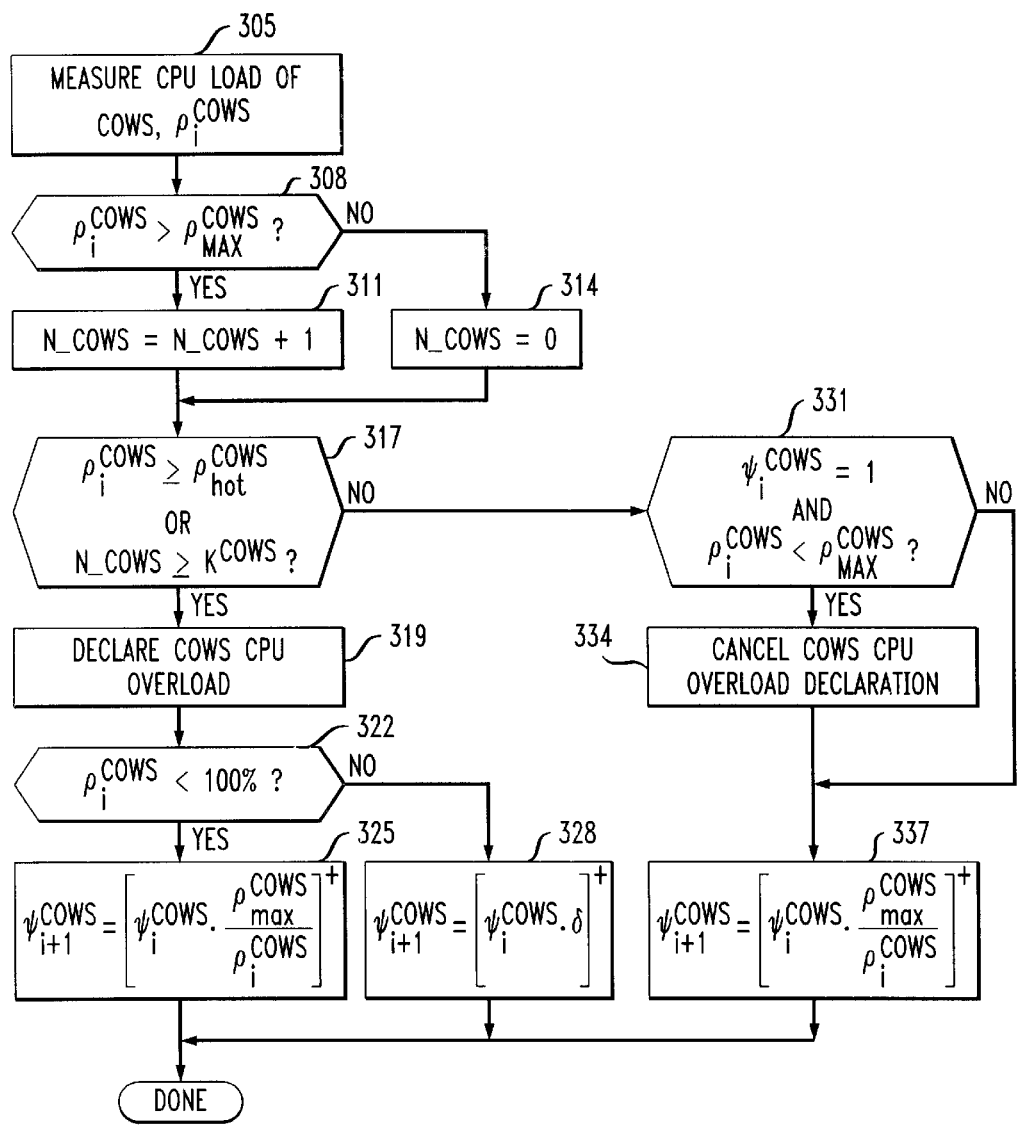
FIG. 3 is a flow chart depicting the steps of a CPU overload control routine for managing the CPU load of a first workstation.

The aforementioned CPU overload control routine in accordance with the invention which is run on COWS 130 will now be described. FIG. 3 illustrates such a routine denoted 300 for determining, e.g., the fraction of paging messages that COWS 123 should process to manage its CPU load. Instructed by routine 300, COWS 123 measures the CPU load experienced thereby, $\rho_i^{COWS}$, during an $i^{th}$ measurement period, $1 \leq i$, as indicated at step 305. COWS 123 at step 308 compares $\rho_i^{COWS}$ with a first predetermined COWS CPU load threshold, $\rho_{max}^{COWS}$. In this instance, $\rho_{max}^{COWS}$ represents the desired maximum CPU load which COWS 123 would sustain, e.g., a load representing 85% of the CPU capacity of COWS 123. If $\rho_i^{COWS} > \rho_{max}^{COWS}$, a counter, N_COWS, for keeping track of the aforementioned "cool-off" period in terms of measurement periods is triggered, thereby increasing N_COWS by one, as indicated at step 311. Otherwise, if $\rho_i^{COWS} \leq \rho_{max}^{COWS}$, N_COWS is set to zero, as indicated at step 314.

Routine 300 proceeds from either step 311 or step 314 to step 317 where $\rho_i^{COWS}$ is compared with a second, higher predetermined COWS CPU load threshold, $\rho_{hot}^{COWS}$, e.g., a load representing 95% of the CPU capacity of COWS 123, and where N_COWS is compared with a predetermined number of measurement periods, $K^{COWS}$, constituting the required cool-off period. If $\rho_i^{COWS} \geq \rho_{hot}^{COWS}$ or N_COWS $\geq K^{COWS}$, COWS 123 declares a COWS CPU overload, as indicated at step 319. Routine 300 then proceeds from step 319 to step 322 where it is determined whether $\rho_i^{COWS}$ is smaller than a 100% CPU capacity of COWS 123. If $\rho_i^{COWS} < 100\%$, COWS 123 at step 325 determines the fraction of paging messages to be processed by COWS 123 during the $(i+1)^{th}$ measurement period, $\psi_{i+1}^{COWS}$, as follows:

$$\psi_{i+1}^{COWS} = \left[\psi_i^{COWS} \cdot \frac{\rho_{max}^{COWS}}{\rho_i^{COWS}}\right]^+, \qquad [1]$$

where $\psi_i^{COWS}$ represents the fraction of paging messages processed by COWS 123 during the $i^{th}$ measurement period. To ensure that $0 < \psi_{i+1}^{COWS} \leq 1$ resulting from routine 300, the operator $[x]^+$ is used which is defined as follows:

$$[x]^+ = \begin{cases} \Delta_{min}, & x \leq \Delta_{min} \\ x, & \Delta_{min} < x \leq 1, \\ 1, & x > 1 \end{cases} \qquad [2]$$

where $\Delta_{min}$ represents a predetermined minimum value greater than zero.

It should be noted that $[\rho_{max}^{COWS}/\rho_i^{COWS}]^{-1}$ is indicative of the severity of the CPU load of COWS 123 during the $i^{th}$ measurement period. Thus, based on expression [1], $\psi_{i+1}^{COWS}$ varies inversely with such COWS CPU load severity. Alternately stated, the fraction of paging messages to be dropped by COWS 123 in the $(i+1)^{th}$ measurement period increases with such COWS CPU load severity.

Otherwise, if at step 322 it is determined that $\rho_i^{COWS}$ is not smaller than a 100% CPU capacity of COWS 123, i.e., equal to 100%, COWS 123 at step 328 instead determines $\psi_{i+1}^{COWS}$ as follows:

$$\psi_{i+1}^{COWS} = [\psi_i^{COWS} \cdot \delta]^+, \qquad [3]$$

where $\delta$ is selected such that $\delta < \rho_{max}^{COWS}$. As a result, $\psi_{i+1}^{COWS}$ is drastically decreased at step 328 where $\rho_i^{COWS} = 100\%$ to boost the reduction in the COWS CPU load, compared with that at step 325 where $\rho_i^{COWS} < 100\%$.

Referring back to step 317, if at step 317 it is determined that $\rho_i^{COWS} < \rho_{hot}^{COWS}$ and N_COWS $< K^{COWS}$, routine 300 proceeds to step 331. If at step 331 it is determined that $\psi_i^{COWS}=1$ and $\rho_i^{COWS}<\rho_{max}^{COWS}$, COWS 123 cancels any previous COWS CPU overload declaration, as indicated at step 334. Routine 300 then proceeds to step 337 where $\psi_{i+1}^{COWS}$ is computed based on expression [1]. Otherwise, if at step 331 it is determined that $\psi_i^{COWS}<1$ or $\rho_i^{COWS}\geq\rho_{max}^{COWS}$, routine 300 skips to step 337 directly. Accordingly, during the $(i+1)^{th}$ measurement period COWS 123 drops $(1-\psi_{i+1}^{COWS})$ fraction of paging messages, in accordance with a well-known go/no-go sequence algorithm.

Figure 4:
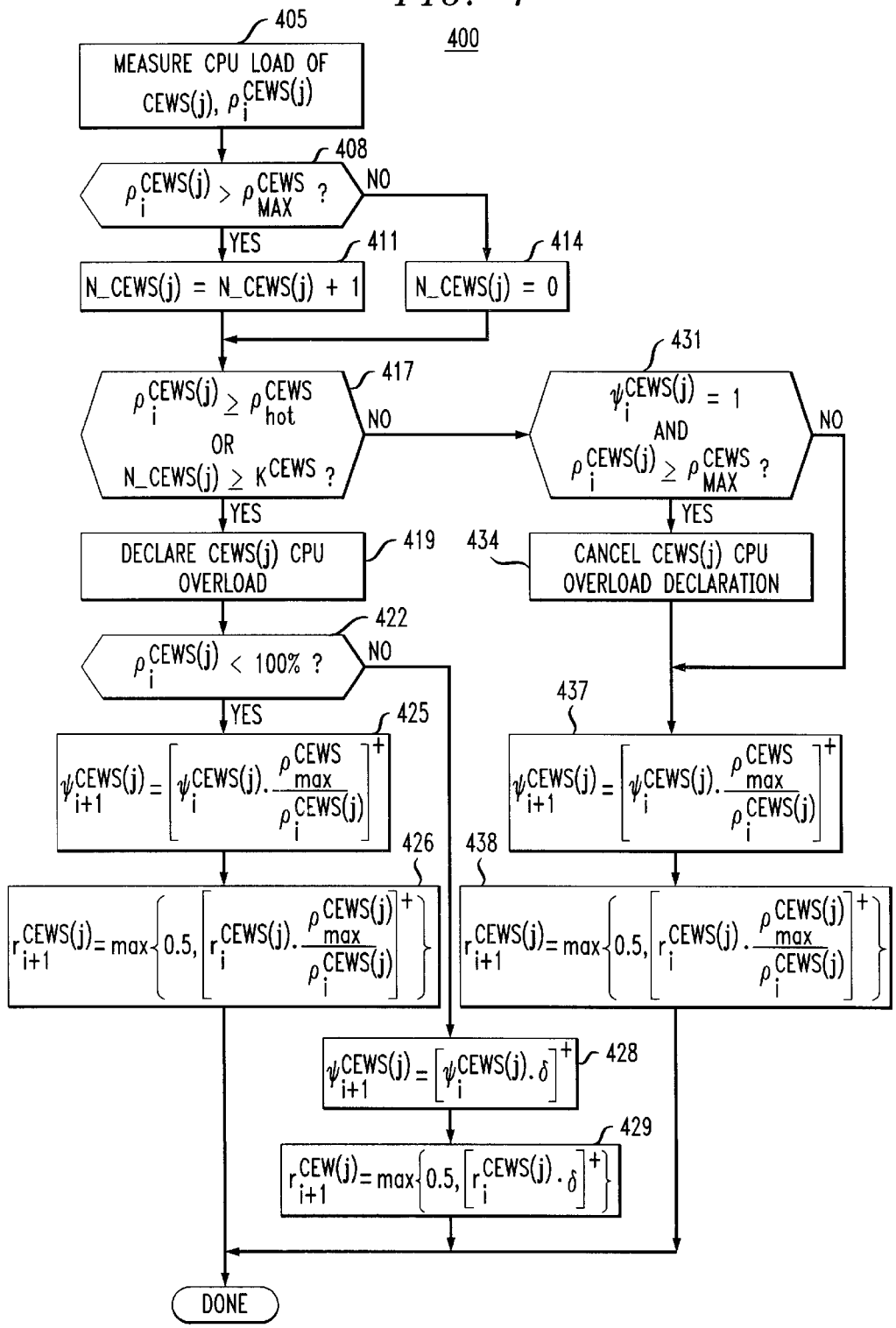
FIG. 4 is a flow chart depicting the steps of a second CPU overload control routine for managing the CPU load of a second workstation connected to the first workstation in a hierarchial arrangement.

A second CPU overload control routine in accordance with the invention which is run on each of CEWS(1) through CEWS(N), generically represented by CEWS(j), $1\leq j\leq N$, will now be described. FIG. 4 illustrates such a routine denoted 400 for determining, e.g., the fraction of paging and SMS cell broadcast messages, $\psi_i^{CEWS(j)}$, and the fraction of MEAS_RES messages, $r_{i+1}^{CEWS(j)}$, that CEWS(j) should process during $(i+1)^{th}$ measurement period to manage its CPU load. Instructed by routine 400, CEWS(j) measures the CPU load experienced thereby, $\rho_i^{CEWS(j)}$, during an $i^{th}$ measurement period, as indicated at step 405. CEWS(j) at step 408 compares $\rho_i^{CEWS(j)}$ with a first predetermined CEWS CPU load threshold, $\rho_{max}^{CEWS}$. In this instance, $\rho_{max}^{CEWS}$ represents the desired maximum CPU load which CEWS(j) would sustain, e.g., a load representing 85% of the CPU capacity of CEWS(j). If $\rho_i^{CEWS(j)}>\rho_{max}^{CEWS}$, a counter, N_CEWS(j), for keeping track of a second cool-off period in terms of measurement periods is triggered, thereby increasing N_CEWS(j) by one, as indicated at step 411. Otherwise, if $\rho_i^{CEWS(j)}\leq\rho_{max}^{CEWS(j)}$, N_CEWS(j) is set to zero, as indicated at step 414.

Routine 400 proceeds from either step 411 or step 414 to step 417 where $\rho_i^{CEWS(j)}$ is compared with a second, higher predetermined CEW CPU load threshold, $\rho_{hot}^{CEWS}$, e.g., a load representing 95% of the CPU capacity of CEWS(j), and where N_CEWS(j) is compared with a second predetermined number of measurement periods, $K^{CEWS}$, constituting the required second cool-off period. If $\rho_i^{CEWS(j)}\geq\rho_{hot}^{CEWS}$ or N_CEWS(j)$\geq K^{CEWS}$, CEWS(j) declares a CEWS(j) CPU overload, as indicated at step 419. Routine 400 then proceeds from step 419 to step 422 where it is determined whether $\rho_i^{CEWS(j)}$ is smaller than a 100% CPU capacity of CEWS(j). If $\rho_i^{CEWS(j)}<100\%$, CEWS(j) at step 425 determines $\psi_{i+1}^{CEWS(j)}$ as follows:

$$\psi_{i+1}^{CEWS(j)} = \left[\psi_i^{CEWS(j)} \cdot \frac{\rho_{max}^{CEWS(j)}}{\rho_i^{CEWS}}\right]^+, \quad [4]$$

where $\psi_i^{CEWS(j)}$ represents the fraction of paging and SMS cell broadcast messages processed by CEWS(j) during the $i^{th}$ measurement period.

Again, it should be noted that $[\rho_{max}^{CEWS}/\rho_i^{CEWS(j)}]^{-1}$ is indicative of the severity of the CPU load of CEWS(j) during the $i^{th}$ measurement period. Thus, based on expression [4], $\psi_{i+1}^{CEWS(j)}$ varies inversely with such CEWS(j) CPU load severity. Alternately stated, the fraction of paging and SMS cell broadcast messages to be dropped by CEWS (j) in the $(i+1)^{th}$ measurement period increases with such CEWS(j) CPU load severity.

Routine 400 proceeds from step 425 to step 426 where $r_{i+1}^{CEWS(j)}$ is determined as follows:

$$r_{i+1}^{CEWS(j)} = \max\left\{0.5, \left[r_i^{CEWS(j)} \cdot \frac{\rho_{max}^{CEWS(j)}}{\rho_i^{CEWS}}\right]^+\right\}, \quad [5]$$

where $r_i^{CEWS(j)}$ represents the fraction of MEAS_RES messages processed by CEWS(j) during the $i^{th}$ measurement period. It should be noted that the max{0.5, . . . } part of expression [5] ensures that CEWS(j) will process at least 50% of the MEAS_RES messages sent by each active mobile unit in the corresponding cell, thereby rendering adequate power control for the wireless communications and proper call handovers as described before.

Otherwise, if at step 422 it is determined that $\rho_i^{CEWS(j)}$ is not smaller than a 100% CEWS(j) CPU capacity, i.e., equal to 100%, CEWS(j) at step 428 determines $\psi_{i+1}^{CEWS(j)}$ as follows:

$$\psi_{i+1}^{CEWS(j)}=[\psi_i^{CEWS(j)}\cdot\delta]^+, \quad [6]$$

where, again, $\delta$ is selected such that $\delta<\rho_{max}^{CEWS}$ to boost the reduction in the CEWS(j) CPU load. Routine 400 then proceeds from step 428 to step 429 where $r_{i+1}^{CEWS(j)}$ is determined as follows:

$$r_{i+1}^{CEWS(j)}=\max\{0.5, [r_i^{CEWS(j)}\cdot\delta]^+\}. \quad [7]$$

Referring back to step 417, if at step 417 it is determined that $\rho_i^{CEWS(j)}<\rho_{hot}^{CEWS}$ and N_CEWS(j)$<K^{CEWS}$, routine 400 proceeds to step 431. If at step 431 it is determined that $\psi_i^{CEWS(j)}=1$ and $\rho_i^{CEWS(j)}<\rho_{max}^{CEWS}$, CEWS(j) cancels any previous CEWS(j) CPU overload declaration, as indicated at step 434. Routine 400 then proceeds to step 437 where $\psi_{i+1}^{CEWS(j)}$ is computed based on expression [4], followed by step 438 where $r_{i+1}^{CEWS(j)}$ is computed based on expression [5]. Otherwise, if at step 431 it is determined that $\psi_i^{CEWS(j)}<1$ or $\rho_i^{CEWS(j)}\geq\rho_{max}^{CEWS}$, routine 400 skips to step 437 directly. Accordingly, during the $(i+1)^{th}$ measurement period CEWS(j) drops a $(1-\psi_{i+1}^{CEWS(j)})$ fraction of paging and SMS cell broadcast messages, and the radio terminal corresponding to CEWS(j) drops a $(1-r_{i+1}^{CEWS(j)})$ fraction of MEAS_RES messages, in accordance with the well-known go/no-go sequence algorithm.

In addition, COWS 123, connected to CEWS(1) through CEWS(N) in the above-described hierarchial arrangement, centrally coordinates the aforementioned access class barring to further control the CPU loads of COWS 123 itself and each CEWS. To effectively realize the access class barring, a variable $A_{i+1}^{CEWS(j)}$ is used to represent the fraction of the general access classes (i.e., access classes 0–9) which is allowed in the cells served by CEWS(j), $1\leq j\leq N$, during the $(i+1)^{th}$ measurement period. Specifically, the fraction of the general access classes that COWS 123 should bar in the cells served by CEWS(j), i.e., $(1-A_{i+1}^{CEWS(j)})$, is mapped to an integral number of general access classes to be barred during the $(i+1)^{th}$ measurement period. To that end, an interval [k/10, (k+1)/10] is designed, where $0\leq k\leq 9$ is an integer, in which the quantity $(1-A_{i+1}^{CEWS(j)})$ lies. The quantity $(1-A_{i+1}^{CEWS(j)})$ is mapped to (k+1) general access classes to be barred if $(1-A_{i+1}^{CEWS(j)})$ lies in the top half of this interval, or to k general access classes to be barred if $(1-A_{i+1}^{CEWS(j)})$ lies in the bottom half of the interval.

COWS 123 determines $A_{i+1}^{CEWS(j)}$ based on, among others, its $\rho_i^{COWS}$, and $\rho_i^{CEWS(j)}$ reported by CEWS(j) thereto at the end of the $i^{th}$ measurement period as follows:

$$A_{i+1}^{CEWS(j)} = \left[A_i^{CEWS(j)} \cdot \min\left(\frac{\rho_{max}^{CEWS(j)}}{\rho_i^{CEWS(j)}}, \frac{\rho_{max}^{COWS}}{\rho_i^{COWS}}\right)\right]^+, \quad [8]$$

where $A_i^{CEWS(j)}$ represents the fraction of the general access classes allowed in the $i^{th}$ measurement period on the cells served by CEWS(j). Expression [8] allows different numbers of access classes to be barred on the cells served by different CEWS(j). The fraction of general access classes allowed on the cells served by CEWS(j) given in expression [8] is selected to keep both COWS 123 and CEWS(j) out of overload during the $(i+1)^{th}$ measurement period. Specifically, the quantity $\rho_{max}^{CEWS(j)}/\rho_i^{CEWS(j)}$ is an estimated reduction (or increase) in the fraction of general access classes allowed on the cells served by CEWS(j) which is required to keep CEWS(j) out of overload during the $(i+1)^{th}$ measurement period. The quantity $\rho_{max}^{COWS(j)}/\rho_i^{COWS(j)}$ is an estimated reduction (or increase) in the fraction of general access classes allowed access to the GSM service required to keep COWS 123 out of overload during the $(i+1)^{th}$ measurement period. Reducing (or increasing) the number of general access classes allowed in the cells served by CEWS(j) by the multiplicative factor min{ . . . } in expression [8] ensures that the reduction (or increase) in the number of general access classes allowed on the cells served by CEWS(j) is sufficient to keep both COWS 123 and CEWS(j) out of overload during the $(i+1)^{th}$ measurement period.

Figure 5A:
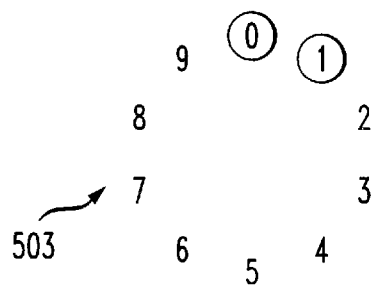
FIGS. 5A, 5B and 5C jointly illustrate a fair access class barring scheme implemented in the communications service.
Figure 5B:
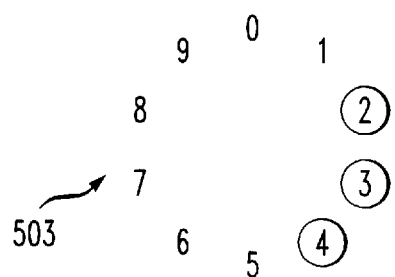
Figure 5C:
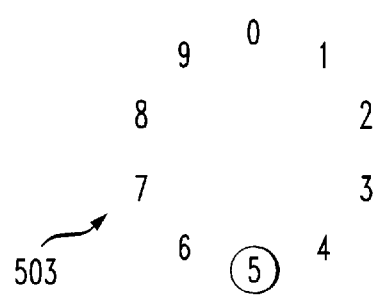

Based on the number of barred access classes for each cell determined above, COWS 123 constructs for each cell a list identifying the actual general access classes to be barred in the cell during the $(i+1)^{th}$ measurement period. This list is constructed in such a way that the inconvenience of being barred is fairly distributed among users of access classes 0–9. An implementation of the fair access class barring scheme for constructing such a list is jointly illustrated by FIGS. 5A, 5B and 5C, with the access class numbers 0–9 arranged in a circle denoted 503. In accordance with this scheme, any barred access class in a current measurement period is different from each barred class in the previous measurement period, provided that the total number of barred classes in both the current and previous measurement periods does not exceed the total number of general access classes, i.e., 10 in this instance. A simple implementation of the fair access class barring scheme is to go around circle 503 to select the access classes to be barred. For example, let's say COWS 123 needs to bar in a cell two access classes in a first measurement period, three access classes in a second measurement period immediately following the first measurement period, and one access class in a third measurement period immediately following the second measurement period. Given that the two access classes barred in the first measurement period are classes 0 and 1 which are shown circled in FIG. 5A, in accordance with the simple fair access class barring scheme implementation, in the second measurement period COWS 123 bars the next three previously unbarred classes on circle 503, i.e., classes 2, 3 and 4, which are shown circled in FIG. 5B. In addition, in the third measurement period COWS 123 bars the next previously unbarred class on circle 503, i.e., class 5, which is shown circled in FIG. 5C.

The foregoing merely illustrates the principles of the invention. It will thus be appreciated that those skilled in the art will be able to devise numerous other arrangements which embody the principles of the invention and are thus within its spirit and scope.

For example, communications arrangement 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. An apparatus for providing a communications service, comprising:

a first processor, coupled to at least one second processor, for performing tasks common to said at least one second processor, a processing load of said first processor being determined and compared to a first and a second threshold, wherein if the processing load of said first processor is greater than said second threshold, said first processor substantially immediately takes a selected action to reduce its processing load, and wherein if the processing load of said first processor is greater than said first threshold but less than said second threshold, said first processor waits for a predetermined condition before taking said selected action to reduce its processing load; and said at least one second processor, arranged in hierarchical relation to said first processor, for performing tasks for realizing the communication service, a processing load of said at least one second processor being determined and compared to a respective first and a respective second threshold, wherein if the processing load of said at least one second processor is greater than said respective second threshold, said at least one second processor substantially immediately takes a selected action to reduce its processing load, and wherein if the processing load of said at least one second processor is greater than said respective first threshold but less than said respective second threshold, said at least one second processor waits for a predetermined condition before taking said selected action to reduce its processing load.

2. The apparatus of claim 1 wherein the communications service is provided to a plurality of communication units, the communication units each being assigned to one of a plurality of classes, the selected action involving selecting a subset of the classes and causing each communication unit assigned to any class in the subset to be inactive in communications.

3. The apparatus of claim 1 wherein the communications service includes a wireless communications service.

4. The apparatus of claim 3 wherein the wireless communications service includes a global system for mobile communications (GSM) service.

5. The apparatus of claim 1 wherein the first processor processes selected messages to realize the communications service, the number of selected messages processed thereby being a function of the first ratio when the first processor is in a particular condition.

6. The apparatus of claim 5 wherein the selected messages include paging messages.

7. The apparatus of claim 5 wherein the particular condition includes a processing overload condition.

8. The apparatus of claim 5 wherein the particular condition is present when the processing load of the first processor is larger than at least one load threshold.

9. The apparatus of claim 8 wherein the at least one load threshold includes the first load threshold and a third higher load threshold.

10. The apparatus of claim 9 wherein the predetermined condition is present when a duration, during which the processing load of the first processor is larger than the first load threshold but not the third higher load threshold, exceeds a predetermined length.

11. The apparatus of claim 1 wherein the first ratio indicates heaviness of the processing load of the first processor.

12. The apparatus of claim 4 wherein the at least one second processor processes selected messages to realize the communications service, the number of selected messages processed thereby being a function of the second ratio when the second processor is in a particular condition.

13. The apparatus of claim 12 wherein the selected messages include paging messages.

14. The apparatus of claim 12 wherein the selected messages include short message service (SMS) cell broadcast messages.

15. The apparatus of claim 12 wherein the selected messages include radio frequency (RF) signal strength messages.

16. The apparatus of claim 12 wherein the particular condition includes a processing overload condition.

17. The apparatus of claim 12 wherein the particular condition is present when the processing load of the at least one second processor is larger than at least one load threshold.

18. The apparatus of claim 17 wherein the at least one load threshold includes the second load threshold and a third higher load threshold.

19. The apparatus of claim 18 wherein the particular condition is present when a duration, during which the processing load of the at least one second processor is larger than the second load threshold but not the third higher load threshold, exceeds a predetermined length.

20. The apparatus of claim 1 wherein the second ratio indicates heaviness of the processing load of the at least one second processor.

21. The apparatus of claim 1, wherein said apparatus provides a communications service to a plurality of communication units, the communication units each being assigned to one of a plurality of classes, and wherein said selected action comprises:
 causing communication units assigned to a first subset of the plurality of classes to be inactive in communications in a selected time period based on at least one of the processing load of the first processor and the processing load of the at least one second processor in a first time period substantially immediately before the selected time period; and
 causing communication units assigned to a second subset of the plurality of classes to be inactive in communications in a second time period substantially immediately after the selected time period based on at least one of the processing load of the first processor and the processing load of the at least one second processor in the selected time period, each class in the first subset being different from each class in the second subset.

22. The apparatus of claim 21 wherein the communications service includes a wireless communications service.

23. The apparatus of claim 22 wherein the wireless communications service includes a GSM service.

24. The apparatus of claim 23 wherein the communication units include mobile units and the plurality of classes include general access classes.

25. The apparatus of claim 21, wherein the first processor includes a workstation.

26. The apparatus of claim 1, wherein said selected action of said first processor comprises causing said at least one second processor to take a selected action to reduce the processing load of said first processor and the processing load of said at least one second processor.

27. A method, comprising:
 determining a processing load of a first processor;
 comparing said determined processing load to a first and a second threshold, said second threshold being of greater value than said first threshold;
 substantially immediately taking, if the processing load of said first processor is greater than said second threshold, a selected action to reduce the processing load of said first processor; and
 waiting, if the processing load of said first processor is greater than said first threshold but less than said second threshold, until a predetermined condition is satisfied before taking said selected action to reduce the processing load of said first processor.

28. The method of claim 27 wherein the communications service is provided to a plurality of communication units, the communication units each being assigned to one of a plurality of classes, the selected action involving selecting a subset of the classes and causing each communication unit assigned to any class in the subset to be inactive in communications.

29. The method of claim 27 wherein the communications service includes a wireless communications service.

30. The method of claim 29 wherein the wireless communications service includes a GSM service.

31. The method of claim 27 further comprising processing selected messages using the first processor to realize the communications service, the number of selected messages processed thereby being a function of a ratio of said determined processing load to said first threshold when the first processor is in a particular condition.

32. The method of claim 31 wherein the selected messages include paging messages.

33. The method of claim 31 wherein the particular condition includes a processing overload condition.

34. The method of claim 31 wherein the particular condition is present when the processing load of the first processor is larger than at least one load threshold.

35. The method of claim 34 wherein the at least one load threshold includes the first of said load thresholds and a third higher load threshold.

36. The method of claim 35 wherein the particular condition is present when a duration, during which the processing load of the first processor is larger than the first load threshold but not the third higher load threshold, exceeds a predetermined length.

37. The method of claim 27 wherein a ratio of said determined processing load to said first threshold indicates heaviness of the processing load of the first processor.

38. The method of claim 30 further comprising processing selected messages using the at least one second processor to realize the communications service, the number of selected messages processed thereby being a function of a ratio of said determined processor load to said second threshold when the second processor is in a particular condition.

39. The method of claim 38 wherein the selected messages include paging messages.

40. The method of claim 38 wherein the selected messages include SMS cell broadcast messages.

41. The method of claim 38 wherein the selected messages include RF signal strength messages.

42. The method of claim 38 wherein the particular condition includes a processing overload condition.

43. The method of claim 38 wherein the particular condition is present when the processing load of the at least one second processor is larger than at least one of said load thresholds.

44. The method of claim 43 wherein the at least one load threshold includes the second load threshold and a third higher load threshold.

45. The method of claim 44 wherein the particular condition is present when a duration, during which the processing load of the at least one second processor is larger than the second load threshold but not the third higher load threshold, exceeds a predetermined length.

46. The method of claim 27 wherein a determined processing load of said at least one second processor to said second threshold indicates heaviness of the processing load of the at least one second processor.

47. The method of claim 27, wherein said method is applied in an apparatus for providing a communications service to a plurality of communication units, the communication units each being assigned to one of a plurality of classes, and wherein said selected action comprises:

causing communication units assigned to a first subset of the plurality of classes to be inactive in communications in a selected time period based on at least the processing load of said processor in a first time period substantially immediately before the selected time period; and causing communication units assigned to a second subset of the plurality of classes to be inactive in communications in a second time period substantially immediately after the selected time period based on at least the processing load of said processor in the selected time period, each class in the first subset being different from each class in the second subset.

48. The method of claim 47 wherein the communications service includes a wireless communications service.

49. The method of claim 48 wherein the wireless communications service includes a GSM service.

50. The method of claim 49 wherein the communication units include mobile units and the plurality of classes include general access classes.

51. The method of claim 27, wherein said selected action of said processor comprises causing at least one second processor, arranged in hierarchical relation to said processor, to take a selected action to reduce the processing load of said processor and the processing load of said at least one second processor.

* * * * *